US007871341B2

(12) United States Patent
Egashira et al.

(10) Patent No.: US 7,871,341 B2
(45) Date of Patent: Jan. 18, 2011

(54) GOLF BALL MATERIAL, GOLF BALL AND METHOD FOR PREPARING GOLF BALL MATERIAL

(75) Inventors: Yoshinori Egashira, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 12/538,374

(22) Filed: Aug. 10, 2009

(65) Prior Publication Data

US 2009/0298616 A1 Dec. 3, 2009

Related U.S. Application Data

(62) Division of application No. 11/477,442, filed on Jun. 30, 2006, now Pat. No. 7,591,739.

(51) Int. Cl.
*A63B 37/00* (2006.01)

(52) U.S. Cl. ...................................................... 473/351

(58) Field of Classification Search .................. 473/351
See application file for complete search history.

(56) References Cited

U.S. PATENT DOCUMENTS

| | | | |
|---|---|---|---|
| 5,112,903 | A | 5/1992 | Sakakibara et al. |
| 5,306,760 | A | 4/1994 | Sullivan |
| 5,312,857 | A | 5/1994 | Sullivan |
| 2002/0078632 | A1 | 6/2002 | Hasegawa et al. |
| 2004/0044136 | A1 | 3/2004 | Kim |
| 2004/0076787 | A1 | 4/2004 | Shikano et al. |

FOREIGN PATENT DOCUMENTS

| | | |
|---|---|---|
| JP | 2003/180878 | 7/2003 |
| WO | 98/46671 | 10/1998 |

*Primary Examiner*—Raeann Trimiew
(74) *Attorney, Agent, or Firm*—Sughrue Mion, PLLC

(57) ABSTRACT

The invention provides a golf ball material composed of (i) a non-ionomeric thermoplastic resin, (ii) an ionomeric resin and/or an acid-containing polymer which is the base resin of an ionomeric resin, and (iii) at least one compound selected from among N,N-dialkylaminoalkyl(meth)acrylamide, N,N-dialkylaminoalkyl(meth)acrylate and derivatives thereof. Methods for preparing such a material, and a golf ball which includes as a component therein a molded part made of the golf ball material are also provided. The golf ball material has a good thermal stability, flow and processability, and can thus be used to obtain high-performance golf balls having an excellent rebound resilience, an outstanding durability and a good flexibility.

15 Claims, No Drawings

GOLF BALL MATERIAL, GOLF BALL AND METHOD FOR PREPARING GOLF BALL MATERIAL

This is a divisional of Application No. 11/477,442 filed Jun. 30, 2006 now U.S. Pat. No. 7,591,739. The entire disclosure of the prior application, application number 11/477,442 is hereby incorporated by reference.

BACKGROUND OF THE INVENTION

The present invention relates to golf ball materials which have a good thermal stability, flow and processability and from which there can be obtained high-performance golf balls having excellent properties such as rebound resilience, durability and flexibility. The invention also relates to golf balls which include as a component therein a molded part made from such a golf ball material, and to methods for preparing such golf ball materials.

In recent years, ionomeric resins have been widely used as cover materials for golf balls. Ionomeric resins are ionic copolymers of an olefin such as ethylene with an unsaturated carboxylic acid such as acrylic acid, methacrylic acid or maleic acid, in which some of the acidic groups are neutralized with metal ions such as sodium, lithium, zinc or magnesium. These resins provide excellent characteristics in terms of durability, rebound resilience and scuff resistance of the ball.

At present, the base resins used in golf ball cover materials are generally ionomeric resins, but a variety of modifications are being made to cope with the constant desire by players for golf balls having a suitable degree of flexibility, a high rebound resilience and an excellent flight performance.

For example, to improve the rebound resilience and the cost characteristics of ionomer cover materials, U.S. Pat. Nos. 5,312,857, 5,306,760 and International Application WO 98/46671 describe cover materials composed of an ionomeric resin to which a large amount of a metallic soap has been added.

However, the metallic soap in these cover materials undergo decomposition and vaporization during injection molding, generating a large amount of fatty acid gases. As a result, molding defects tend to arise. Moreover, the gases that have formed deposit on the surface of the molded part, markedly lowering its paintability. The rebound resilience characteristics obtained with such cover materials do not differ much from those provided by ionomer covers of the same hardness which contain no metallic soap; the rebound resilience in both cases is about the same. Hence, only a small positive effect is observable from the inclusion of a metallic soap; such addition does not markedly increase rebound resilience. Moreover, depending on the type of metallic soap used, the processability and the rebound resilience characteristics are sometimes significantly deteriorated, making the cover material entirely unfit for practical use.

In addition, materials in the form of simple molten mixtures of a soft thermoplastic resin and an ionomeric resin have been developed (JP-A 2003-180878). However, even though the material appears to be uniform during the production process, there has been some concern that when the material is injection-molded to form a golf ball layer, the high shear forces in the mold will cause delamination taken place or arisen within the layer formed by the molten mixture.

An ionomeric resin used as a golf ball material which has recently been developed is a homogeneous-phase, high-rebound resilience material that has an interpenetrating polymer network (IPN) structure (U.S. patent application Ser No.

2004/0044136). The ionomer is obtained by mixing a first ingredient such as an ethylene-(meth)acrylic acid copolymer with a second ingredient that is a different type of thermoplastic resin to form a resin composition, then adding a metal ionic species as a third ingredient to the resin composition to neutralize the acids of the first ingredient dispersed in the resin composition. However, in this production method, if the different type of thermoplastic resin used as the second ingredient is poorly compatible or completely incompatible with the ionomeric resin matrix thereby created, when injection-molding is carried out using this material to form a golf ball layer, the high shear forces in the mold sometimes cause delamination taken place or arisen within the layer, raising concerns over a decline in the properties of the golf ball. This tendency is most clearly observed in thermoplastic resins which have a low heat resistance and are prone to thermal degradation.

SUMMARY OF THE INVENTION

It is therefore an object of the present invention to provide a golf ball material which is able to suppress delamination taken place or arisen within a golf ball layer formed by injection-molding and thus enables golf balls having the desired properties to be obtained; that is, which has a good thermal stability, flow and processability, and from which high-performance golf balls having excellent durability, scuff resistance and flexibility (suitable hardness) can be obtained. Another object of the invention is to provide a golf ball which includes as a component therein a molded part made from such a golf ball material. A further object of the invention is to provide a method for preparing such a golf ball material.

As a result of extensive investigations, the inventors have discovered that an ionomeric resin composition obtained by blending one or more compounds selected from among N,N-dialkylaminoalkyl(meth)acrylamide, N,N-dialkylaminoalkyl(meth)acrylate and derivatives thereof, in the presence of a peroxide, with the thermoplastic resin used in the present invention, then melt-mixing the blend with an ionomeric resin under applied heat is capable of inhibiting delamination when injection-molded as a golf ball material. The inventors have also found that an ionomeric resin composition obtained by melt-blending one or more compounds selected from among N,N-dialkylaminoalkyl(meth)acrylamide, N,N-dialkylaminoalkyl(meth)acrylate and derivatives thereof, in the presence of a peroxide, with a non-ionomeric thermoplastic resin and an acid-containing polymer that is the base resin of an ionomeric resin so as to form an acid-containing polymer composition, then adding thereto a metal ion species and carrying out an acid-neutralizing reaction, can provide a golf ball material which, when injection-molded, inhibits delamination.

The inventors have additionally learned that these ionomeric resin compositions have a surprisingly good thermal stability, flow and processability, and are ideal materials for forming high-performance golf balls having excellent properties such as durability, scuff resistance and flexibility without any loss in the rebound resilience of the molded part.

From additional investigations, the inventors have also found that golf balls which include a molded part of such a golf ball material as a component therein (here and below, “component” refers to the cover material or intermediate layer material in a two-piece solid golf ball composed of a core and a cover embracing the core, or in a multi-piece solid golf ball composed of a core of at least one layer, an intermediate layer of at least one layer embracing the core, and a cover of at least one layer embracing the intermediate layer), have an excellent durability, scuff resistance and flexibility without any loss of rebound resilience.

Accordingly, the invention provides the following golf ball material, methods for preparing such golf ball materials, and a golf ball which includes as a component therein a molded part of such a golf ball material.

[I] A golf ball material which includes: (i) a non-ionomeric thermoplastic resin, (ii) an ionomeric resin and/or an acid-containing polymer that is the base resin of an ionomeric resin, and (iii) at least one compound selected from among N,N-dialkylaminoalkyl(meth)acrylamide, N,N-dialkylaminoalkyl(meth)acrylate and derivatives thereof.

[II] A method for preparing a golf ball material which includes the steps of, in order, melt-blending (iii) at least one compound selected from among N,N-dialkylaminoalkyl(meth)acrylamide, N,N-dialkylaminoalkyl(meth) acrylate and derivatives thereof, a peroxide, and (i) a non-ionomeric thermoplastic resin in a temperature range at which the peroxide does not decompose rapidly; adding (ii) an ionomeric resin and/or an acid-containing polymer that is the base resin of an ionomeric resin; and melt-mixing at or above the temperature at which the peroxide decomposes.

[III] A method for preparing a golf ball material which includes the steps of, in order, melt-blending (iii) at least one compound selected from among N,N-dialkylaminoalkyl(meth)acrylamide, N,N-dialkylaminoalkyl(meth) acrylate and derivatives thereof, a peroxide, (i) a non-ionomeric thermoplastic resin, and (ii) an acid-containing polymer that is the base resin of an ionomeric resin in a temperature range at which the peroxide does not decompose rapidly; adding an oxygen-containing inorganic metal compound-typed metal ionic species; and melt-blending at or above the temperature at which the peroxide decomposes so as to induce both a grafting reaction of the at least one compound selected from among N,N-dialkylaminoalkyl(meth)acrylamide, N,N-dialkylaminoalkyl(meth) acrylate and derivatives thereof primarily onto the non-ionomeric thermoplastic resin and the acid-neutralizing reaction of the resin composition with the metal ionic species, thereby obtaining a golf ball material having an interpenetrating network structure.

[IV] A golf ball which includes as a component therein a molded part made of the above golf ball material, and preferably a golf ball wherein the above golf ball material is used as a cover material or an intermediate layer material in a two-piece solid golf ball composed of a core and a cover which embraces the core or in a multi-piece solid golf ball composed of a core of at least one layer, an intermediate layer of at least one layer which embraces the core, and a cover of at least one cover which embraces the intermediate layer.

DETAILED DESCRIPTION OF THE INVENTION

The invention is described below in more detail.

The golf ball material of the invention is composed of: (i) a non-ionomeric thermoplastic resin, (ii) an ionomeric resin and/or an acid-containing polymer that is the base resin of an ionomeric resin, and (iii) at least one compound selected from among N,N-dialkylaminoalkyl(meth)acrylamide, N,N-dialkylaminoalkyl(meth)acrylate and derivatives thereof. The method for preparing such a golf ball material involves blending the compound (iii), in the presence of a peroxide, with the non-ionomeric thermoplastic resin (i) and the ionomeric resin (ii), then melt-mixing under applied heat. Alternatively, instead of the ionomeric resin, the acid-containing polymer which is the base resin thereof is used, and melt-mixing is carried out under applied heat in the same way as above.

The present invention relates to ionomeric resin systems, which generally have a poor compatibility with non-ionomeric thermoplastic resins. Specifically, it provides an ionomeric resin composition that includes a non-ionomeric thermoplastic resin, which inhibits delamination arisen during injection-molding.

Moreover, this invention, which has as its object the preparation of a golf ball material that, in an ionomeric resin composition containing therein a non-ionomeric thermoplastic resin, inhibits delamination arisen during injection-molding, has a good thermal stability, flow and processability, and can be used to produce golf balls having excellent durability, scuff resistance and flexibility without any loss of rebound resilience, was led on the basis of the discovery that one or more compounds selected from among N,N-dialkylaminoalkyl (meth)acrylamide, N,N-dialkylaminoalkyl(meth)acrylate and derivatives thereof functions as an excellent interphase crosslinking agent between ionomeric resins and non-ionomeric thermoplastic resins.

That is, the inventors have discovered that interphase crosslinking between a non-ionomeric thermoplastic resin and an ionomeric resin can be carried out by, in the presence of a peroxide, grafting the double bond of one or more compounds selected from among N,N-dialkylaminoalkyl(meth) acrylamide, N,N-dialkylaminoalkyl(meth)acrylate and derivatives thereof primarily onto the non-ionomeric thermoplastic resin and linking the terminal tertiary amino group with the ionomeric resin through ionic interactions, and have found that the resulting ionomeric resin composition is useful as a golf ball material which is capable of suppressing delamination arisen during injection-molding.

The inventors have also found that an ionomeric resin composition with an IPN structure, obtained by blending the above-described one or more compounds selected from among N,N-dialkylaminoalkyl(meth)acrylamide, N,N-dialkylaminoalkyl(meth)acrylate and derivatives thereof, in the presence of a peroxide, with a non-ionomeric thermoplastic resin and an acid-containing polymer that is the base resin of an ionomeric resin, i.e., one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, to form an acid-containing polymer composition, then melt-mixing therein an oxygen-containing inorganic metal oxide-typed metal ionic species so as to induce both a grafting reaction involving the one or more compounds selected from among N,N-dialkylaminoalkyl(meth)acrylamide, N,N-dialkylaminoalkyl(meth)acrylate and derivatives thereof and also a neutralization reaction involving the acids in the composition, is useful as a golf ball material in which delamination arisen during injection-molding is suppressed.

Furthermore, the inventors have learned that, if the thermoplastic resin used in the invention has basic functional groups (e.g., amino groups, imino groups), by using a polymer containing acids (e.g., carboxylic acids) other than dicarboxylic acids or acid anhydrides thereof so as to avoid the reaction of dicarboxylic acids or acid anhydrides thereof with the basic functional groups, even the ionomeric resin composition obtained according to the above formulation is suitable as a golf ball material in which delamination arisen during injection-molding is suppressed.

In the practice of the invention, by including in the ionomeric resin composition one or more compounds selected from among N,N-dialkylaminoalkyl(meth)acrylamide, N,N-dialkylaminoalkyl(meth)acrylate and derivatives thereof, non-ionomeric thermoplastic resins, which are non-compatible or poorly compatible with an ionomeric resin layer, can also be incorporated with relatively good uniformity, thereby giving a golf ball material in which delamination is suppressed during injection-molding, which has a good thermal stability, flow and processability, and which can be used to produce golf balls having an excellent durability, scuff resistance and flexibility without any loss of rebound resilience.

In the invention, if the one or more compounds selected from among N,N-dialkylaminoalkyl(meth)acrylamide, N,N-dialkylaminoalkyl(meth)acrylate and derivatives thereof is not used in the process of preparing the non-ionomeric thermoplastic resin-containing ionomeric resin composition, delamination will usually tend to arise when injection-molding is carried out. On the other hand, using an excess amount of the above compound will lead to gel formation, making the ionomeric resin composition non-uniform, and in turn preventing the physical properties that are the object of the inventive golf ball material from being achieved.

In the practice of the invention, one or more compounds selected from among N,N-dialkylaminoalkyl(meth)acrylamide, N,N-dialkylaminoalkyl(meth)acrylate and derivatives thereof, a peroxide, a non-ionomeric thermoplastic resin and an ionomeric resin are melt-blended in the process of preparing the non-ionomeric thermoplastic resin-containing ionomeric resin composition. It is preferable to first melt-blend one or more compounds selected from among N,N-dialkylaminoalkyl(meth)acrylamide, N,N-dialkylaminoalkyl (meth)acrylate and derivatives thereof, the peroxide and the non-ionomeric thermoplastic resin at a low temperature at which the peroxide does not decompose rapidly, then add the ionomeric resin and melt-mix the components at or above the temperature at which the peroxide decomposes.

Also, in the process of preparing the non-ionomeric thermoplastic resin-containing ionomeric resin composition in the invention, by melt-blending one or more compounds selected from among N,N-dialkylaminoalkyl(meth)acrylamide, N,N-dialkylaminoalkyl(meth)acrylate and derivatives thereof, the peroxide, the non-ionomeric thermoplastic resin and the acid-containing polymer at a temperature low enough so that the peroxide does not decompose rapidly, then adding an oxygen-containing inorganic metal compound-typed metal ionic species and melt-mixing the ingredients at a temperature at or above the temperature at which the peroxide decomposes, both a grafting reaction involving one or more compound selected from among N,N-dialkylaminoalkyl (meth)acrylamide, N,N-dialkylaminoalkyl(meth)acrylate and derivatives thereof and an acid-neutralizing reaction involving the acids in the composition take place, thereby creating an ionomeric resin composition having an IPN structure. It is desirable in this case to use a process in which first one or more compounds selected from among N,N-dialkylaminoalkyl(meth)acrylamide, N,N-dialkylaminoalkyl (meth)acrylate and derivatives thereof, the peroxide, and the non-ionomeric thermoplastic resin are melt-blended at a temperature low enough so that the peroxide does not decompose too soon, then the acid-containing polymer is melt blended at a temperature low enough that the peroxide does not decompose, and finally the oxygen-containing inorganic metal compound-typed metal ionic species is added and melt-blending is carried out at or above the temperature at which the peroxide decomposes.

In the practice of the invention, if the non-ionomeric thermoplastic resin has basic functional groups (e.g., amino groups or imino groups), to avoid the reaction of dicarboxylic acids or acid anhydrides thereof with the basic functional groups, it is desirable for a polymer containing acids (e.g., carboxylic acids) other than dicarboxylic acids or acid anhydrides thereof to be used as the acid-containing polymer which is added.

One or more compounds selected from among N,N-dialkylaminoalkyl(meth)acrylamide, N,N-dialkylaminoalkyl (meth)acrylate and derivatives thereof used in the invention is exemplified as follows.

The alkyl moiety is selected from among alkyl, aryl and aralkyl groups having 1 to 20 carbons ($C_{1-20}$). Illustrative examples include N,N-dimethyl(meth)acrylamide, N,N-diethyl(meth)acrylamide, N,N-dimethylaminoethyl(meth) acrylamide, N,N-dimethylaminopropyl(meth)acrylamide, N,N-diethylaminoethyl(meth)acrylamide, N,N-diethylaminopropyl(meth)acrylamide, N,N-dimethylaminoethyl(meth) acrylate, N,N-diethylaminoethyl(meth)acrylate, N,N-diethylaminopropyl(meth)acrylate and 4-N,N-dimethylaminobenzyl acrylate. All of these have tertiary amino groups. Primary amino groups and secondary amino groups having reactive hydrogens are undesirable because they can react with free carboxylic acid groups in the ionomer resin (to form a crosslinked structure), and thus tend to lead to a decline in the flow properties (a lower melt flow rate) and gelation through crosslinkages. The amount of addition, per 100 parts by weight of the combined amount of the non-ionomeric thermoplastic resin and the ionomeric resin or the acid-containing polymer that is the base resin thereof, is preferably from 0.05 to 20 parts by weight, more preferably from 0.1 to 10 parts by weight, and even more preferably from 0.5 to 5.0 parts by weight. If an excess amount of those is added, the resulting ionomeric resin composition may exhibit a dramatic decline in melt flow rate (MFR) and undergo gel formation, making it impossible to obtain normal molded parts. Conversely, if an excessively small amount of those is added, the resulting ionomeric resin composition may give rise to delamination during injection molding, possibly leading to a poor scuff resistance and a low rebound resilience, and thus having an adverse influence on the properties of the golf ball obtained as the finished product.

The peroxide used together with one or more compounds selected from among N,N-dialkylaminoalkyl(meth)acrylamide, N,N-dialkylaminoalkyl(meth)acrylate and derivatives thereof is suitably selected with reference to the decomposition temperature thereof and the melting temperature at which the non-ionomeric thermoplastic resin that is used can be kneaded. Specifically, use is typically made of a peroxide having a 1-minute half-life temperature of preferably from 140 to 250° C., more preferably 150 to 230° C., and even more preferably 160 to 210° C. Illustrative examples of such peroxides that may be utilized include one or more selected from among dicumyl peroxide (1-minute half-life temperature, 175° C.), di-t-butyl peroxide (185° C.), 2,5-dimethyl-2,5-di (t-butylperoxy)-3-hexyne (194° C.), n-butyl-4,4-di(t-butylperoxy)valerate (173° C.), di(2-t-butylperoxyisopropyl)benzene (175° C.), di-t-hexyl peroxide (177° C.) and p-menthanehydroperoxide (200° C.). Of these, the use of dicumyl peroxide, di-t-butyl peroxide and 2,5-dimethyl-2,5-di(t-butylperoxy)-3-hexyne are preferred. It is desirable to set the amount of the peroxide included, per 100 parts by weight of the combined amount of the non-ionomeric thermoplastic resin and the ionomeric resin and/or the acid-containing polymer serving as the base resin thereof, at preferably from 0.05 to 20 parts by weight, more preferably from 0.08 to 15 parts by weight, even more preferably from 0.1 to 10 parts by weight, and most preferably from 0.5 to 5.0 parts by weight.

The non-ionomeric thermoplastic resin used in the invention is one or more selected from among polyolefin elastomers (including polyolefins and metallocene polyolefins), polystyrene elastomers, polyacrylate polymers, polyamide elastomers, polyurethane elastomers, polyester elastomers and polyacetals. Specific examples include polyethylene methacrylate, maleic anhydride-grafted polyethylene ethyl acrylate, hexamethylene diisocyanate (HDI)-poly-ϵ-caprolactone (PCL), 4,4'-dicyclohexylmethane diisocyanate (H12-MDI)-polytetramethylene glycol (PTMG), polystyrene-butylene, polybutylene terephthalate, polyether polyamide and polyoxymethylene. The weight ratio (non-ionomeric thermoplastic resin/ionomeric resin or acid-containing polymer serving as the base resin thereof) is typically from 1/99 to 99/1, preferably from 5/95 to 95/5, and more preferably from 10/90 to 90/10.

The ionomer resin used in the invention is one or more ionomer resins obtained by neutralizing, with a degree of neutralization ranging from 5 to 90 mol %, one or more polymers having an acid content of 0.5 to 30 wt %, preferably 1.0 to 25 wt %, and selected from among olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-containing polymers with one or more metal cations selected from among groups IA, IB, IIA, IIB, IIIA, IIIB, IVA, IVB, VA, VB, VIA, VIB, VIIB AND VIIIB of the periodic table.

Specific examples include 60 mol % Zn (degree of neutralization with zinc)-polyethylene-methacrylic acid copolymer, 40 mol % Mg (degree of neutralization with magnesium)-polyethylene-methacrylic acid copolymer, and 40 mol % Mg (degree of neutralization with magnesium)-polyethylene-methacrylic acid-isobutyl acrylate terpolymer.

In the practice of the invention, if the non-ionomeric thermoplastic resin has basic functional groups such as amino groups or imino groups, a polymer containing acids (e.g., carboxylic acids) other than dicarboxylic acids or acid anhydrides thereof may be used to avoid preferential reaction of dicarboxylic anhydrides or acid anhydrides thereof with the basic functional groups. Such a polymer is exemplified by an olefin-unsaturated carboxylic acid copolymer having an acid content of 0.5 to 30 wt %, and preferably 1.0 to 25 wt %. The number of carbons on the olefin is generally at least 2 and not more than 8, preferably not more than 6. Illustrative examples of such olefins include ethylene, propylene, butene, pentene, hexene, heptene and octene. The use of ethylene is especially preferred. Illustrative examples of the unsaturated carboxylic acid include acrylic acid, methacrylic acid, dimethylacrylic acid, and ethacrylic acid. The use of acrylic acid and methacrylic acid is especially preferred.

Alternatively, an olefin-unsaturated carboxylic acid-unsaturated carboxylic acid ester terpolymer is used as the polymer containing acids other than dicarboxylic acids and acid anhydrides thereof. The unsaturated carboxylic acid ester is preferably a lower alkyl ester of an unsaturated carboxylic acid. For example, use made of one or more selected from among methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. The content, expressed as a weight ratio (non-ionomeric thermoplastic resin/acid-containing polymer) is preferably from 1/99 to 99/1, more preferably from 5/95 to 95/5, and even more preferably from 10/90 to 90/10.

In the invention, the acid-containing polymer composition prepared from the one or more compound selected from among N,N-dialkylaminoalkyl(meth)acrylamide, N,N-dialkylaminoalkyl(meth)acrylate and derivatives thereof, the peroxide, the non-ionomeric thermoplastic resin and the acid-containing polymer that is the base resin of an ionomeric resin is subjected to a neutralization reaction with a metal ionic species, enabling an ionomeric resin composition having an IPN structure to be obtained. The oxygen-containing inorganic metal compound-typed metal ionic species used in this invention is one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide. It is preferable for these oxygen-containing inorganic metal compounds to be used in the form of nanoparticles and/or a master batch. The amount in which these metal ionic species are included (degree of neutralization) varies with the acid content of the particular acid-containing polymer used that is the base resin of an ionomeric resin. The degree of neutralization is preferably from 1 to 95 mol %, more preferably from 5 to 90 mol %, and even more preferably from 10 to 80 mol %. If the degree of neutralization is excessively high, the flow properties of the ionomeric resin composition decline (i.e., the melt index decreases), which makes injection-molding difficult to carry out. Moreover, during injection-molding, the heat generated by shear increases, causing thermal degradation and delamination of the non-ionomeric thermoplastic resin incorporated within the ionomeric resin composition. Conversely, if the degree of neutralization is excessively low, although the composition will have flow properties, due to a decline in the degree of ionic crosslinking, the mechanical strength of the ionomeric resin composition itself decreases, possibly leading to a decline in ball strength and low durability when the composition is used as a golf ball material.

It is desirable for the acid-neutralizing reaction of the acid-containing polymer composition with the oxygen-containing inorganic metal compound-typed metal ionic species to be carried out using a vented twin-screw extruder having arranged thereon a screw segment with a kneading disc zone.

Optional additives are included in the golf ball material of the invention, where appropriate for the intended use. When the golf ball material of the invention is to be used as a cover material, in addition to the above-described essential ingredients, additives such as pigments, dispersants, antioxidants, ultraviolet absorbers and light stabilizers are also included. Such additives are included in an amount, per 100 parts by weight of the essential ingredients, of preferably at least 0.1 part by weight, and more preferably at least 0.5 part by weight, but preferably not more than 10 parts by weight, and more preferably not more than 4 parts by weight.

The golf ball material of the invention has a specific gravity of preferably at least 0.9, more preferably at least 0.92, and even more preferably at least 0.94, but preferably not more than 1.3, more preferably not more than 1.2, and even more preferably not more than 1.05.

Molded parts obtained using the inventive golf ball material have a Shore D hardness of preferably at least 40, and more preferably at least 45, but preferably not more than 75, and more preferably not more than 70. If the Shore D hardness is excessively high, there is a marked decline in the impact feel of the resulting golf ball when hit it. On the other hand, if the Shore D hardness is excessively low, the rebound resilience of the ball decreases.

The inventive golf ball material which is an ionomeric resin composition is used as a cover material or an intermediate layer material in a two-piece solid golf ball composed of a core and a cover embracing the core, or in a multi-piece solid golf ball composed of a core of at least one layer, an intermediate layer of at least one layer which embraces the core, and a cover of at least one layer which embraces the intermediate layer.

In the inventive golf ball material and the method of preparation thereof, the principal component is either an ionomeric resin composition obtained by melt-mixing under applied heat one or more compounds selected from among N,N-dialkylaminoalkyl(meth)acrylamide, N,N-dialkylaminoalkyl(meth)acrylate and derivatives thereof, in the presence of a peroxide, with a non-ionomeric thermoplastic resin and an ionomeric resin, or an ionomeric resin composition having an IPN structure obtained by melt-mixing under applied heat according to the same procedure just described above but using, instead of the ionomeric resin, the acid-containing polymer that is the base resin thereof, then carrying out an acid-neutralizing reaction with a metal ionic species. As a result, when the golf ball material is injection-molded, delamination is suppressed, the golf ball material exhibits a good thermal stability, flow and processability, and high-performance golf balls having excellent properties such as durability, scuff resistance and flexibility can be obtained.

EXAMPLES

Examples are given below by way of illustration and not by way of limitation. The twin-screw extruder used in the examples of the invention to carry out the reactions ("dynamic reaction twin-screw extruder") had a screw diameter of 32 mm, an overall L/D ratio of 41, and an L/D ratio for the kneading disc zone which was 40% of the overall L/D ratio. Moreover, it had a vacuum vent port and was equipped with a device for injecting water under pressure.

Preparation of Metal Oxide Master Batch (MgMB)

A metal oxide master batch was prepared according to the method described in Japanese Patent Application No. 2005-227691 (a master batch means a concentrate). That is, a 5-liter pressure kneader (manufactured by Naniwa Machinery Manufacturing Co., Ltd.; setting temperature, 100° C.) was charged with a combined amount of 2.0 kg of Nucrel N0200H (an ethylene-methacrylic acid-isobutyl acrylate terpolymer produced by E.I. DuPont de Nemours & Co.) as the base polymer for the master batch and magnesium hydroxide $Mg(OH)_2$ (average particle size, 0.8 μm; produced by Kyowa Chemical Industry Co., Ltd.) in a weight ratio (N0200H/$Mg(OH)_2$) of 50/50, and mixing was carried out for 20 minutes under an applied pressure of 0.49 MPa at a rotor revolution speed of 35 rpm and at a mixing temperature controlled in a range of 120 to 130° C. The mixture was discharged as strands from a 40 mm-diameter twin-screw/single-screw extruder (Naniwa Machinery Manufacturing Co., Ltd.; setting temperature, 180° C.), passed through a cooling water bath and an air knife, then being cut into pellets by a pelletizer. The melt flow rate (MFR) of the resulting $Mg(OH_2)$-containing master bath having a $Mg(OH)_2$ content of 50 wt % was 2.3 g/10 min (measured at 190° C. under a load of 2,160 g). This master batch is designated below as "MgMB."

Example 1

The acid-containing polymer composition was obtained by first mixing with the dynamic reaction twin-screw extruder the respective ingredients including DMAPA, but except the metal oxide master batch MgMB, in the formulation indicated in Table 1, at the melting temperature at which the peroxide PO does not decompose (170° C.).

Next, the amount of MgMB shown in Table 1 was added to this polymer composition, then both the 40 mol % neutralization reaction and the PO decomposition were carried out with the dynamic reaction twin-screw extruder at the setting temperature of 200° C., thereby giving the uniform ionomeric resin composition. The melt flow rate (MFR) and the Shore D hardness of the resulting ionomeric resin composition are shown in Table 1. As shown in Table 1, the ionomeric resin composition in this example had the suitable hardness and the melt flow rate appropriate for injection-molding. Next, using this ionomeric resin composition as the cover material for two-piece golf balls, the composition was injection-molded over the core of crosslinked butadiene rubber (core properties: diameter, 38.9 mm; weight, 36.0 g; deflection, 3.35 mm) using the injection-molding machine (setting temperatures: hopper, 160° C.; C1 to head, 180 to 210° C.) at the injection pressure of 5.9 MPa, the holding pressure of 4.9 MPa, the injection and holding time of 8 seconds, and the cooling time of 25 seconds, thereby producing the two-piece golf ball. After injection-molding, the surface of the golf ball was trimmed, yielding the finished golf ball (diameter, 42.7 mm; weight, 45.5 g). The golf ball was then evaluated. The results are show in Table 1, indicating that the golf ball had a smooth surface free of burrs, a good scuff resistance, an excellent ball durability (number of shots, 304), a high initial velocity and a high coefficient of restitution (COR).

Example 2

Aside from replacing DMAPA with DMAPAA in the formulation shown in Table 1, the uniform ionomeric resin composition was obtained by following the same procedure as in Example 1. After injection-molding, the surface of the golf ball was trimmed, yielding the finished golf ball. The results are shown in Table 1, indicating that the golf ball had a smooth surface free of burrs, a good scuff resistance, an excellent ball durability (number of shots, 309), a high initial velocity and a high coefficient of restitution (COR).

Example 3

Aside from changing the amounts of DMAPAA and PO used and replacing some portion of Polymer-4 with Polymer-3 in the formulation shown in Table 1, the uniform ionomeric resin composition was obtained by following the same procedure as in Example 1. After injection-molding, the surface of the golf ball was trimmed, yielding the finished golf ball. The results are shown in Table 1, indicating that the golf ball had a smooth surface free of burrs, a good scuff resistance, an outstanding ball durability (number of shots, 343), a high initial velocity and a high coefficient of restitution (COR).

Example 4

Aside from adding the soft Polymer-1 as an ingredient in the formulation shown in Table 1, the uniform ionomeric resin composition was obtained by following the same procedure as in Example 1. After injection-molding, the surface of the golf ball was trimmed, yielding the finished golf ball. The results are shown in Table 1, indicating that the golf ball had a smooth surface free of burrs, low hardness, a good scuff resistance, an excellent ball durability (number of shots, 336), a high initial velocity and a high coefficient of restitution (COR).

Comparative Example 1

As a comparative example for Examples 1 and 2 of the invention, the ionomeric resin composition was obtained by following the same procedure as in Example 1, but using the formulation shown in Table 1 from which PO and DMAPA or DMAPAA were excluded. After injection-molding, the surface of the golf ball was trimmed, yielding the finished golf ball. The results are shown in Table 1, indicating that the golf ball had burrs on its surface (coarse surface) and a markedly decreased ball durability (number of shots, 114). The coefficient of restitution (COR) was also lower, and the delamination phenomenon was observed on the surface of the ball cover layer.

Comparative Example 2

As a comparative example for Examples 1 and 2 of the invention, the ionomeric resin composition was obtained by using each of the ionomer ingredients in the formulation shown in Table 1 from which PO and DMAPA or DMAPAA were excluded, and melt-blending with the dynamic reaction twin-screw extruder at the setting of 210° C. After injection-molding, the surface of the golf ball was trimmed, yielding the finished golf ball. The results are shown in Table 1, indicating that the golf ball had burrs on its surface (coarse surface) and a markedly decreased ball durability (number of shots, 131). The coefficient of restitution (COR) was also lower, and the delamination phenomenon was observed on the surface of the ball cover layer.

Comparative Example 3

As a comparative example for Example 4 of the invention, the ionomeric resin composition was obtained by following the same procedure as in Example 1, but using the formulation shown in Table 1 from which DMAPAA and PO were excluded. After injection-molding, the surface of the golf ball was trimmed, yielding the finished golf ball. The results are shown in Table 1, indicating that the golf ball had burrs on its surface (coarse surface) and a significantly decreased ball durability (number of shots, 189). The coefficient of restitution (COR) was also lower, and the delamination phenomenon observed on the surface of the ball cover layer.

Comparative Example 4

As a comparative example for Example 4 of the invention, the ionomeric resin composition was obtained by using each of the ionomer ingredients in the formulation shown in Table 1 from which DMAPAA and PO were excluded, and melt-blending with the dynamic reaction twin-screw extruder at the setting temperature of 210° C. After injection-molding, the surface of the golf ball was trimmed, yielding the finished golf ball. The results are shown in Table 1, indicating that the golf ball had burrs on its surface (coarse surface) and a markedly decreased ball durability (number of shots, 106). The coefficient of restitution (COR) was also lower, and delamination was found to have occurred on the surface of the ball cover layer.

TABLE 1

| | Example | | | | Comparative Example | | | |
|---|---|---|---|---|---|---|---|---|
| Phase | 1 | 2 | 3 | 4 | 1 | 2 | 3 | 4 |
| a. MgMB | 3.12 | 3.12 | 2.91 | 2.58 | 3.12 | — | 2.58 | — |
| b. TPU | 20 | 20 | 20 | 20 | 20 | 20 | 20 | 20 |
| c. DMAPA | 0.7 | — | — | — | — | — | — | — |
| d. DMAPAA | — | 0.7 | 0.6 | 0.6 | — | — | — | — |
| e. PO | 0.2 | 0.2 | 0.23 | 0.23 | — | — | — | — |
| f. Polymer -1 | — | — | — | 13 | — | — | 13 | 13 |
| g. Polymer -2 | 10 | 10 | 10 | 10 | 10 | | 10 | |
| h. Polymer -2' | | | | | | 10 | | 10 |
| i. Polymer -3 | — | — | 10 | — | — | — | — | — |
| j. Polymer -4 | 70 | 70 | 60 | 57 | 70 | | 57 | |
| k. Polymer -4' | | | | | | 70 | | 57 |
| l. $TiO_2$ | 1.0 | 1.0 | 1.0 | 1.0 | 1.0 | 1.0 | 1.0 | 1.0 |
| m. Blue pigment | 0.02 | 0.02 | 0.02 | 0.02 | 0.02 | 0.02 | 0.02 | 0.02 |
| Specific gravity | 0.988 | 0.988 | 0.987 | 0.987 | 0.985 | 0.986 | 0.986 | 0.986 |
| MFR (g/10 min, 190° C.) | 5.2 | 5.2 | 4.5 | 4.1 | 9.4 | 5.5 | 5.3 | 5.4 |
| Hardness (Shore D) | 58 | 58 | 57 | 53 | 59 | 59 | 54 | 54 |
| Deflection (mm) 23° C. | 2.72 | 2.72 | 2.79 | 2.86 | 2.76 | 2.77 | 2.82 | 2.85 |
| Initial velocity (m/sec), 23° C. | 78.43 | 78.42 | 78.39 | 78.33 | 78.40 | 78.47 | 78.25 | 78.31 |
| Average COR (first shot to final shot until ball cracks) | 0.810 | 0.811 | 0.809 | 0.808 | 0.808 | 0.805 | 0.803 | 0.804 |
| Shot number (durability) | 304 | 309 | 343 | 336 | 114 | 131 | 189 | 106 |
| Scuff resistance (23° C.) | 3 | 3 | 3 | 3 | 3-4 | 4 | 3-4 | 4 |
| Abrasion resistance (Sand) | Good | Good | Good | Good | Poor | Poorer | Poor | Poorer |
| Golf ball surface after trimming with #500 for 3.5 sec | Smooth | Smooth | Smooth | Smooth | Rough | Rough | Rough | Rough |

Note:
Numbers shown for ingredients a to m in table indicate parts by weight.

Ingredient names and other entries in the above table are explained below.

a. MgMB
Magnesium hydroxide/ethylene-methacrylic acid-isobutyl acrylate terpolymer=50/50 wt %.

b. TPU
Aliphatic polyurethane (HMDI-PCL), produced by DIC-Bayer.

c. DMAPA
N,N-Dimethylaminopropyl acrylate, produced by Kanto Chemical Co., Inc.

d. DMAPAA
N,N-Dimethylaminopropylacrylamide, produced by Kanto Chemical.

e. PO
2,5-Dimethyl-2,5-di(t-butylperoxy)hexyne-3, produced by NOF Corporation.

f. Polymer 1
Ethylene-ethyl acrylate-maleic anhydride terpolymer, produced by ARKEMA.

g. Polymer 2
Ethylene-methacrylic acid copolymer (MFR, 500 g/10 min), produced by DuPont.

h. Polymer 2'
Polymer 2 in which 40 mol % of acid groups are neutralized with magnesium ions.

i. Polymer 3
Ethylene-methacrylic acid-isobutyl acrylate terpolymer (MFR, 31 g/10 min), produced by DuPont.

j. Polymer 4
Ethylene-methacrylic acid copolymer (MFR, 60 g/10 min), produced by DuPont.

k. Polymer 4'
Polymer 4 in which 40 mol % of acid groups are neutralized with magnesium ions.

l. $TiO_2$
Tipaque PF737, produced by Ishihara Sangyo Kaisha.

m. Blue Pigment
Pigment Blue 29, produced by Toyo Ink.

MFR (g/10 min)

The melt flow rate was measured in accordance with JIS-K7210 at a test temperature of 190° C. and a test load of 21.18 N (2.16 kgf).

Shore D Hardness

The Shore D hardness was measured in accordance with ASTM D-2240.

Deflection

This test was carried out at a temperature of 23±1° C. The golf ball was placed on a steel plate, and the deflection (mm) by the ball was measured when subjected to a final load of 1,275 N (130 kgf) from an initial load of 98 N (10 kgf).

Initial Velocity

The initial velocity was measured using an initial velocity measuring apparatus of the same type as the USGA drum rotation-type initial velocity instrument approved by the R&A. The ball was held at a temperature of 23±1° C. for at least 3 hours, then tested at the same temperature. The ball was hit using a 250-pound (113.4 kg) head (striking mass) at an impact velocity of 143.8 ft/s (43.83 m/s). Ten balls were each hit two times. The time taken to traverse a distance of 6.28 ft (1.91 m) was measured and used to compute the initial velocity of the ball. This cycle was carried out over a period of about 15 minutes.

Coefficient of Restitution (COR)

The ball was fired from an air cannon against a steel plate at a velocity of 43 m/s, and the rebound velocity was measured. The coefficient of restitution (COR) is the ratio of the rebound velocity to the initial velocity of the ball.

Durability

The durability of the golf ball was evaluated using an ADC Ball COR Durability Tester produced by Automated Design Corporation (U.S.A). A ball was fired using air pressure and made to repeatedly strike two metal plates arranged in parallel. The average number of shots required for the ball to crack was treated as its durability. These average values were obtained by setting four balls of the same type for the testing, repeatedly firing each ball until it cracked, and averaging the number of shots required for each of the balls to crack. The type of tester used was a horizontal COR durability tester, and the incident velocity of the balls on the metal plates was 43 m/s.

Scuff Resistance

The golf balls were held at a temperature of 23±1° C. and hit at a head speed of 33 m/s using a pitching wedge mounted on a swing robot machine, after which damage taken place by the impact was visually rated according to the following scale.

| | |
|---|---|
| Best: | 1 point |
| Better: | 2 points |
| Good (ordinary): | 3 points |
| Poor: | 4 points |
| Poorer: | 5 points |
| Poorest: | 6 points |

Abrasion Resistance

A tubular container having a five liter capacity was filled with 15 golf balls and 1.7 liters of sand, after which the contents were mixed at 50 rpm for 2 hours. The balls were then removed and, based on a visual determination of the extent of surface marring and decreased gloss due to abrasion, the abrasion resistance was rated as follows.

Best
Better
Good (ordinary)
Poor
Poorer
Poorest

Ball Appearance after Surface Abrasion (Trimming)

The injection-molded golf ball was surface abraded (trimmed) with a #500 grinding wheel for 3.5 seconds, following which the surface appearance of the ball was rated as follows.

Smooth
Less rough
Rough

The invention claimed is:

1. A method for preparing a golf ball material, comprising the steps of, in order, melt blending (iii) at least one compound selected from among N,N dialkylaminoalkyl(meth) acrylamide, N,N dialkylaminoalkyl(meth)acrylate and derivatives thereof, a peroxide, and (i) a non-ionomeric thermoplastic resin in a temperature range at which the peroxide does not decompose rapidly; adding (ii) an ionomeric resin and/or an acid containing polymer that is the base resin of an ionomeric resin; and melt-mixing at or above a temperature at which the peroxide decomposes.

2. A method for preparing a golf ball material, comprising the steps of, in order, melt-blending (iii) at least one compound selected from among N,N dialkylaminoalkyl(meth) acrylamide, N,N dialkylaminoalkyl(meth)acrylate and derivatives thereof, a peroxide, (i) a non-ionomeric thermoplastic resin, and (ii) an acid-containing polymer that is the base resin of an ionomeric resin in a temperature range at which the peroxide does not decompose rapidly; adding an oxygen-containing inorganic metal compound-typed metal ionic species; and melt blending at or above a temperature at which the peroxide decomposes so as to induce both a grafting reaction of the at least one compound selected from among N,N dialkylaminoalkyl(meth)acrylamide, N,N dialkylaminoalkyl(meth)acrylate and derivatives thereof and an acid-neutralizing reaction of the acid moiety in the ingredient(ii), thereby obtaining a golf ball material having an interpenetrating network structure.

3. The method for preparing a golf ball material of claim 1, wherein the peroxide is selected from among compounds having a 1-minute half-life decomposition temperature in a range of 140 to 250° C., and is added in an amount of 0.05 to 15 parts by weight per 100 parts by weight of the combined amount of the resin ingredients.

4. The method for preparing a golf ball material of claim 1, wherein component (ii) is an ionomeric obtained by neutralizing one or more polymers having an acid content of 0.5 to 30 wt % and selected from among olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-containing polymers with one or more metal cations selected from among groups IA, IB, IIA, IIB, IIIA, IIIB, IVA, IVB, VA, VB, VIA, VIB, VIIB AND VIIIB of the periodic table.

5. The method for preparing a golf ball material of claim 2, wherein the oxygen-containing inorganic metal compound typed metal ionic species is one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide, and the oxygen containing inorganic metal compound is used in the form of nanoparticles or a master batch.

6. The method for preparing a golf ball material of claim 1, wherein the acid-containing polymer is one or more polymers having an acid content of 0.5 to 30 wt %, selected from among olefin-unsaturated carboxylic acid copolymers and olefin-unsaturated carboxylic acid-unsaturated carboxylic acid ester terpolymers.

7. The method for preparing a golf ball material of claim 2, wherein the acid-neutralizing reaction on the acid containing polymer composition by the oxygen-containing inorganic metal compound-typed metal ionic species is carried out using a vented twin-screw extruder having arranged thereon a screw segment with a kneading disc zone.

8. A golf ball comprising as a component therein a molded part made of a golf ball material comprising: (i) a non-ionomeric thermoplastic resin, (ii) an ionomeric resin and/or an acid containing polymer that is the base resin of an ionomeric resin, and (iii) at least one compound selected from among N,N-dialkylaminoalkyl(meth)acrylamide, N,N-dialkylaminoalkyl(meth)acrylate and derivatives thereof

9. A golf ball which is (A) a two-piece solid golf ball composed of a core and a cover which embraces the core or (B) a multi-piece solid golf ball composed of a core of at least one layer, an intermediate layer of at least one layer which embraces the core, and a cover of at least one layer which embraces the intermediate layer, wherein a golf ball material comprising: (i) a non-ionomeric thermoplastic resin, (ii) an ionomeric resin and/or an acid containing polymer that is the base resin of an ionomeric resin, and (iii) at least one compound selected from among N,N-dialkylaminoalkyl(meth)acrylamide, N,N-dialkylaminoalkyl(meth)acrylate and derivatives thereof, is used as a cover material or an intermediate layer material.

10. The method for preparing a golf ball material of claim 2, wherein the peroxide is selected from among compounds having a 1-minute half-life decomposition temperature in a range of 140 to 250° C., and is added in an amount of 0.05 to 15 parts by weight per 100 parts by weight of the combined amount of the resin ingredients.

11. The method for preparing a golf ball material of claim 2, wherein the acid-containing polymer is one or more polymers having an acid content of 0.5 to 30 wt%, selected from among olefin-unsaturated carboxylic acid copolymers and olefin-unsaturated carboxylic acid-unsaturated carboxylic acid ester terpolymers.

12. A golf ball comprising as a component therein a molded part made of a golf ball material prepared by a method for preparing a golf ball material, comprising the steps of, in order, melt blending (iii) at least one compound selected from among N,N dialkylaminoalkyl(meth)acrylamide, N,N dialkylaminoalkyl(meth)acrylate and derivatives thereof, a peroxide, and (i) a non-ionomeric thermoplastic resin in a temperature range at which the peroxide does not decompose rapidly; adding (ii) an ionomeric resin and/or an acid containing polymer that is the base resin of an ionomeric resin; and melt-mixing at or above a temperature at which the peroxide decomposes.

13. A golf ball which is (A) a two-piece solid golf ball composed of a core and a cover which embraces the core or (B) a multi-piece solid golf ball composed of a core of at least one layer, an intermediate layer of at least one layer which embraces the core, and a cover of at least one layer which embraces the intermediate layer, wherein a golf ball material prepared by a method for preparing a golf ball material, comprising the steps of, in order, melt blending (iii) at least one compound selected from among N,N dialkylaminoalkyl(meth)acrylamide, N,N dialkylaminoalkyl(meth)acrylate and derivatives thereof, a peroxide, and (i) a non-ionomeric thermoplastic resin in a temperature range at which the peroxide does not decompose rapidly; adding (ii) an ionomeric resin and/or an acid containing polymer that is the base resin of an ionomeric resin; and melt-mixing at or above a temperature at which the peroxide decomposes, is used as a cover material or an intermediate layer material.

14. A golf ball comprising as a component therein a molded part made of a golf ball material prepared by a method for preparing a golf ball material, comprising the steps of, in order, melt-blending (iii) at least one compound selected from among N,N dialkylaminoalkyl(meth) acrylamide N N dialkylaminoalkyl(meth)acrylate and derivatives thereof, a peroxide, (i) a non-ionomeric thermoplastic resin, and (ii) an acid-containing polymer that is the base resin of an ionomeric resin in a temperature range at which the peroxide does not decompose rapidly; adding an oxygen-containing inorganic metal compound-typed metal ionic species; and melt blending at or above a temperature at which the peroxide decomposes so as to induce both a grafting reaction of the at least one compound selected from among N,N dialkylaminoalkyl (meth)acrylamide, N,N dialkylaminoalkyl(meth)acrylate and derivatives thereof and an acid-neutralizing reaction of the acid moiety in the ingredient(ii), thereby obtaining a golf ball material having an interpenetrating network structure.

15. A golf ball which is (A) a two-piece solid golf ball composed of a core and a cover which embraces the core or (B) a multi-piece solid golf ball composed of a core of at least one layer, an intermediate layer of at least one layer which embraces the core, and a cover of at least one layer which embraces the intermediate layer, wherein a golf ball material prepared by a method for preparing a golf ball material comprising the steps of, in order, melt-blending (iii) at least one compound selected from among N,N dialkylaminoalkyl(meth)acrylamide, N,N dialkylaminoalkyl(meth)acrylate and derivatives thereof, a peroxide, (i) a non-ionomeric thermoplastic resin, and (ii) an acid-containing polymer that is the base resin of an ionomeric resin in a temperature range at which the peroxide does not decompose rapidly; adding an oxygen-containing inorganic metal compound-typed metal ionic species; and melt blending at or above a temperature at which the peroxide decomposes so as to induce both a grafting reaction of the at least one compound selected from among N,N dialkylaminoalkyl (meth)acrylamide, N,N dialkylaminoalkyl(meth)acrylate and derivatives thereof and an acid-neutralizing reaction of the acid moiety in the ingredient(ii), thereby obtaining a golf ball material having an interpenetrating network structure, is used as a cover material or an intermediate layer material.

* * * * *